US010593971B1

(12) United States Patent
Blanchet

(10) Patent No.: US 10,593,971 B1
(45) Date of Patent: Mar. 17, 2020

(54) METHODS AND SYSTEMS FOR CONTROLLING WATER IMBALANCE IN AN ELECTROCHEMICAL CELL

(71) Applicant: Nuvera Fuel Cells, LLC, Billerica, MA (US)

(72) Inventor: Scott Blanchet, Chelmsford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 16/181,965

(22) Filed: Nov. 6, 2018

(51) Int. Cl.
*H01M 8/04* (2016.01)
*H01M 8/04828* (2016.01)
(Continued)

(52) U.S. Cl.
CPC ....... *H01M 8/04835* (2013.01); *H01M 8/045* (2013.01); *H01M 8/04179* (2013.01);
(Continued)

(58) Field of Classification Search
CPC ......... H01M 8/04179; H01M 8/04303; H01M 8/04358; H01M 8/04388; H01M 8/04402;
(Continued)

(56) References Cited

U.S. PATENT DOCUMENTS

| 6,376,111 B1 | 4/2002 | Mathias et al. |
| 6,887,598 B2 | 5/2005 | Thompson et al. |

(Continued)

FOREIGN PATENT DOCUMENTS

| JP | 2007-52937 A | 3/2007 |
| JP | 4678132 B2 * | 4/2011 |

OTHER PUBLICATIONS

Machine translation for Kitamura, JP 4678132 B2. (Year: 2019).*
(Continued)

*Primary Examiner* — Raymond Alejandro
(74) *Attorney, Agent, or Firm* — Finnegan, Henderson, Farabow, Garrett & Dunner, LLP

(57) ABSTRACT

A system and method of controlling water imbalance in an electrochemical cell is provided. The method includes determining a present water imbalance in the electrochemical cell by summing a $water_{in}$ and a $water_{created}$ less a $water_{out}$. $Water_{in}$ represents an amount of water introduced into the electrochemical cell by an oxidant feed gas; $water_{created}$ represents an amount of water created by the electrochemical cell from the electrochemical reaction; and $water_{out}$ represents an amount of water discharged from the electrochemical cell by an oxidant exhaust gas. The method includes tracking a cumulative water imbalance during operation of the electrochemical cell by repeatedly determining the present water imbalance and continuing to sum the results during operation. And, the method also includes adjusting a flow rate of the oxidant feed gas entering the electrochemical cell based on the cumulative water imbalance.

12 Claims, 3 Drawing Sheets

(51) Int. Cl.
*H01M 8/04119* (2016.01)
*H01M 8/04303* (2016.01)
*H01M 8/0432* (2016.01)
*H01M 8/04492* (2016.01)
*H01M 8/04955* (2016.01)
*H01M 8/04537* (2016.01)
*H01M 8/0438* (2016.01)
*H01M 8/04701* (2016.01)
*H01M 8/04746* (2016.01)

(52) U.S. Cl.
CPC ... *H01M 8/04303* (2016.02); *H01M 8/04358* (2013.01); *H01M 8/04388* (2013.01); *H01M 8/04402* (2013.01); *H01M 8/04514* (2013.01); *H01M 8/04522* (2013.01); *H01M 8/04641* (2013.01); *H01M 8/04723* (2013.01); *H01M 8/04753* (2013.01); *H01M 8/04843* (2013.01); *H01M 8/04955* (2013.01)

(58) Field of Classification Search
CPC ............ H01M 8/045; H01M 8/04514; H01M 8/04522; H01M 8/04641; H01M 8/04723; H01M 8/04753; H01M 8/04828; H01M 8/04843; H01M 8/04835; H01M 8/04955
See application file for complete search history.

(56) References Cited

U.S. PATENT DOCUMENTS

| | | | |
|---|---|---|---|
| 7,432,005 B2 | 10/2008 | Keskula et al. | |
| 7,507,488 B2 | 3/2009 | Thyroff et al. | |
| 7,531,253 B2 | 5/2009 | Ramschak | |
| 2002/0180448 A1 | 12/2002 | Imamura et al. | |
| 2003/0003334 A1* | 1/2003 | Yoshizawa | H01M 8/04029 429/414 |
| 2003/0186093 A1* | 10/2003 | St-Pierre | H01M 8/04303 429/413 |
| 2006/0263653 A1* | 11/2006 | Sinha | H01M 8/04126 429/413 |
| 2007/0264551 A1* | 11/2007 | Matsunaga | H01M 4/8605 429/483 |
| 2008/0311438 A1* | 12/2008 | Rutkowski | H01M 8/04014 429/411 |
| 2010/0291446 A1 | 11/2010 | Aso et al. | |

OTHER PUBLICATIONS

PCT Notification of Transmittal of the International Search Report and the Written Opinion of the International Searching Authority, issued in International Application No. PCT/US2018/059389 dated Jul. 8, 2019, 15 pages.

* cited by examiner

METHODS AND SYSTEMS FOR CONTROLLING WATER IMBALANCE IN AN ELECTROCHEMICAL CELL

The present disclosure is directed to electrochemical cells, and more specifically, to methods and systems for controlling water imbalance in an electrochemical cell or a stack of cells.

Electrochemical cells, usually classified as fuel cells or electrolysis cells, are devices used for generating current from chemical reactions, or inducing a chemical reaction using a flow of current. For example, a fuel cell converts the chemical energy of fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrons then flow through the circuit to the cathode and generate electricity, while the protons diffuse through the electrolyte membrane to the cathode. At the cathode, hydrogen protons combine with electrons and oxygen (supplied to the cathode) to produce water and heat.

An electrolysis cell represents a fuel cell operated in reverse. A basic electrolysis cell functions as a hydrogen generator by decomposing water into hydrogen and oxygen gases when an external electric potential is applied.

The basic technology of a hydrogen fuel cell or an electrolysis cell can be applied to electrochemical hydrogen manipulation, such as, for example, electrochemical hydrogen compression, purification, or expansion. Electrochemical hydrogen manipulation has emerged as a viable alternative to the mechanical systems traditionally used for hydrogen management. Successful commercialization of hydrogen as an energy carrier and the long-term sustainability of a "hydrogen economy" depend largely on the efficiency and cost-effectiveness of fuel cells, electrolysis cells, and other hydrogen manipulation/management systems.

In operation, a single fuel cell can generally generate about 1 volt. To obtain the desired amount of electrical power, individual fuel cells are combined to form a fuel cell stack, wherein fuel cells are stacked together sequentially.

Not only is water generated at the cathode as a by-product of the conversion of a fuel and an oxidant into electricity as previously described, but water can also be introduced into the cell as humidity/vapor in the oxidant and/or fuel gas (collectively, "input gases"). And because the electrochemical cell may be operated in a variety of environmental conditions, the humidity (and other parameters, e.g., temperature) of the input gases may vary.

Water is typically removed from the electrochemical cells by virtue of the exhausted flow of the reactant gases, for example, oxygen. Inefficient removal of water may lead to flooding of the electrochemical cell. Flooding of the electrochemical cell may lead to a reduction or complete cessation of reactant gas flow. Excess accumulation of water can lead to failure of the individual electrochemical cell, which can then lead to instability and/or failure of the electrochemical cell stack.

Although the overabundance of water in an electrochemical cell can adversely affect its performance, water is necessary to support operation of the cell. For example, water content in the polymer membrane makes the electrochemical reaction possible as it increases ionic conductivity.

Attempts to maintain a water balance or equilibrium (i.e., between a flooded state and a dried-out state) have included, e.g., correlating current output to water content and making operational adjustments when change in current suggests performance change of the cell. However, such correlations do not take into account the rapidly changing equilibrium dynamics, and therefore, efforts to correct the equilibrium may be too late or insufficient, and thus, electrochemical cell performance may suffer or cease.

In view of the need to maintain water content equilibrium in an electrochemical cell, the present disclosure is directed to methods and systems designed to overcome one or more issues associated with existing water management technology in electrochemical cells and electrochemical cell stacks.

In one aspect, the present disclosure is directed to a method of controlling water imbalance in an electrochemical cell. In some embodiments, the method may include determining a present water imbalance in the electrochemical cell by summing a $water_{in}$ and a $water_{created}$ less a $water_{out}$. In some embodiments, $water_{in}$ may be an amount of water introduced into the electrochemical cell by an oxidant feed gas; $water_{created}$ may be an amount of water created by the electrochemical cell from the electrochemical reaction; and $water_{out}$ may be an amount of water discharged from the electrochemical cell by an oxidant exhaust gas. In some embodiments, the method may also include tracking a cumulative water imbalance during operation of the electrochemical cell by repeatedly determining the present water imbalance and continuing to sum the results during operation. And, in some embodiments, the method may also include adjusting a flow rate of the oxidant feed gas entering the electrochemical cell based on the cumulative water imbalance.

In another aspect, the present disclosure is directed to an electrochemical cell system. In some embodiments, the electrochemical cell system may include an electrochemical cell; a plurality of oxidant gas inlet sensors, an oxidant gas exhaust sensor, a coolant inlet sensor, a coolant exhaust sensor, and a current transducer; and a controller. In some embodiments, the controller may be configured to determine a present water imbalance in the electrochemical cell by summing a $water_{in}$ and a $water_{created}$ less a $water_{out}$. In some embodiments, $water_{in}$ may be an amount of water introduced into the electrochemical cell by an oxidant feed gas; $water_{created}$ may be an amount of water created by the electrochemical cell from the electrochemical reaction; and $water_{out}$ may be an amount of water discharged from the electrochemical cell by an oxidant exhaust gas. In some embodiments, the controller may also be configured to track a cumulative water imbalance during operation of the electrochemical cell by repeatedly determining the present water imbalance and continuing to sum the results during operation. And, in some embodiment, the controller may also be configured to adjust a flow rate of the oxidant feed gas entering the electrochemical cell based on the cumulative water imbalance.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to an electrochemical cell, in particular, a fuel cell employing hydrogen, oxygen, and water, it is understood that the devices and methods of the present disclosure can be employed with various types of fuel cells and electrochemical cells, including, but not limited to electrolysis cells, hydrogen purifiers, hydrogen expanders, and hydrogen compressors.

Figure 1:
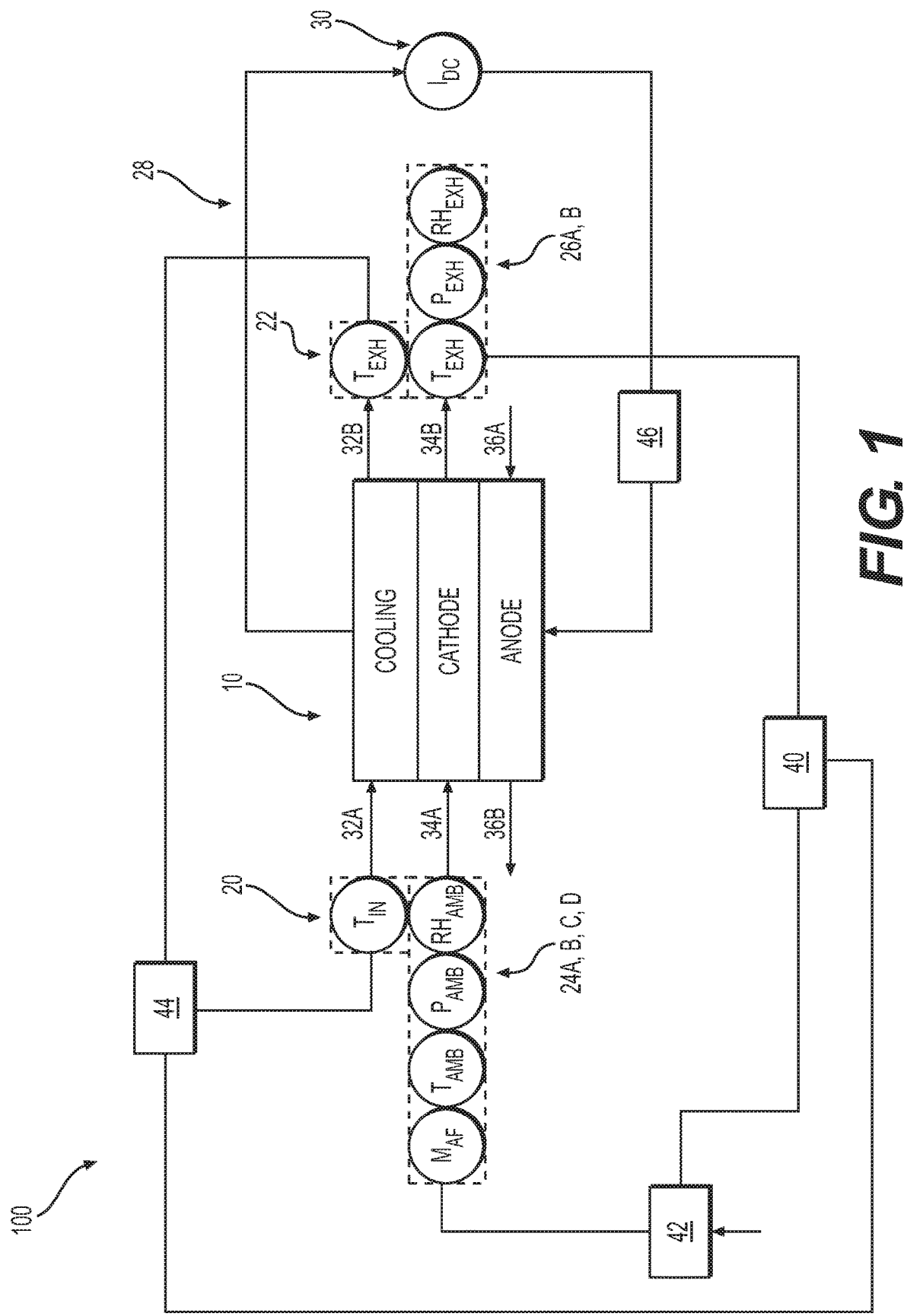
FIG. 1 shows a schematic of an electrochemical cell system, according to an exemplary embodiment.

FIG. 1 shows a schematic view of an electrochemical cell system 100 according to an exemplary embodiment of the present disclosure. Electrochemical cell system 100 may include an electrochemical cell 10, which may be, for example, a PEM fuel cell have, among other things, an anode and a cathode separate by an electrolyte. System 100 may be configured to receive and discharge an oxidant gas (e.g., oxygen or ambient air), a reactant gas (e.g., hydrogen), and a coolant through electrochemical cell 10. Although FIG. 1 and the following description references electrochemical cell 10, it is to be understood that the description is equally applicable to an electrochemical cell stack, which may include a plurality of electrochemical cells 10.

Oxidant gas may be delivered to a cathode of electrochemical cell 10 while the fuel gas may be delivered to an anode of electrochemical cell 10. Coolant may also be delivered to a coolant pathway of electrochemical cell 10. Coolant may be supplied to electrochemical cell 10 by a coolant pump 44 through a coolant inlet line 32A and discharged from electrochemical cell 10 through a coolant outlet line 32B. Oxidant gas may be supplied to electrochemical cell 10 through an oxidant gas inlet line 34A and discharged through an oxidant gas exhaust line 34B. Oxidant gas may be supplied to oxidant gas inlet line 34A by a compressor 42 or another suitable device. In some embodiments, compressor 42 may be supplied oxidant (e.g., air) from the ambient environment or other suitable oxidant source. Fuel gas may be supplied to cell 10 through fuel gas inlet line 36A and discharged through fuel gas exhaust line 36B. Cell 10 may also include a current circuit 28 connected to an electrical load 30. In operation, flow of oxidant and fuel gases into electrochemical cell 10, through their respective inlet lines, results in an electrochemical reaction at the electrolyte membrane separating the anode and the cathode to generate an electric current supplied to electrical load 30 via current circuit 28.

Figure 2:
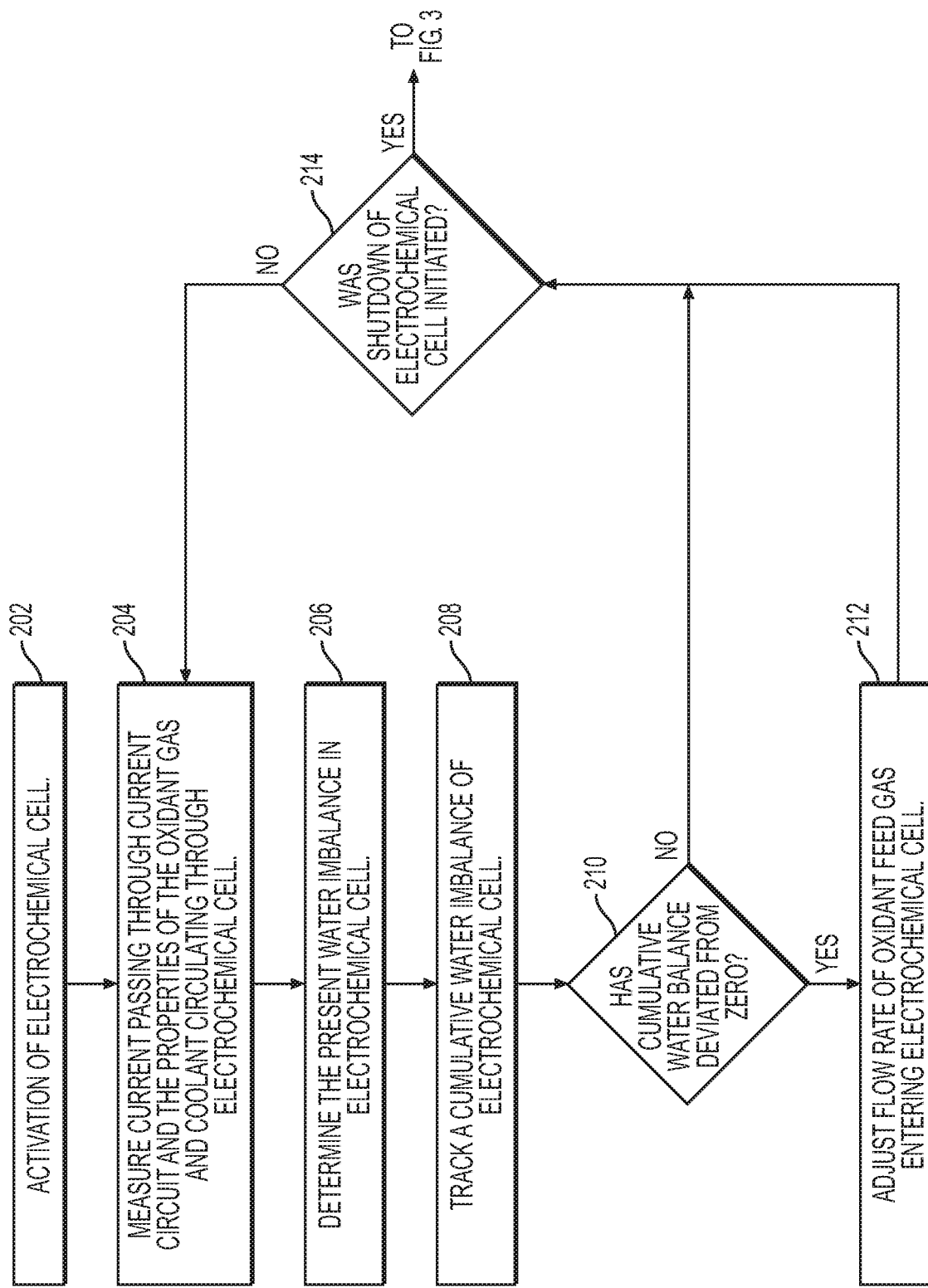
FIG. 2 is a flow diagram illustrating a method of controlling water imbalance in an electrochemical cell system, according to an exemplary embodiment.

Electrochemical cell system 100 may include one or more coolant inlet sensors that may be positioned along coolant inlet line 32A and one or more coolant outlet sensors that may be positioned along coolant outlet line 32B. For example, as depicted in FIG. 2, system 100 may include a coolant inlet sensor 20 configured to measure a coolant inlet temperature of the coolant supplied to electrochemical cell 10 through coolant inlet line 32A. In some embodiments, system 100 may include a coolant outlet sensor 22 configured to measure a coolant outlet temperature of the coolant discharge from electrochemical cell 10 through coolant outlet line 32B. In some embodiments, other coolant inlet sensors and coolant outlet sensors may be utilized to measure other properties of the incoming and outgoing coolant. For example, additional temperature sensors, a flow rate sensor, a pressure sensor, or a conductivity sensor may be utilized.

Electrochemical cell system 100 may also include one or more oxidant gas inlet sensors that may be positioned along oxidant gas inlet line 34A. According to an exemplary embodiment, system 100 may include at least four oxidant gas inlet sensors 24: a first oxidant gas inlet sensor 24A for measuring ambient pressure of the oxidant feed gas, a second oxidant gas inlet sensor 24B for measuring ambient temperature of the oxidant feed gas, a third oxidant gas inlet sensor 24C for measuring ambient humidity of the oxidant feed gas, and a fourth oxidant gas inlet sensor 24D for measuring mass flow rate of the oxidant feed gas. In some embodiments a single oxidant gas inlet device may be utilized to measure several of these parameters. For example, in some embodiments an oxidant sensor 24 may measure ambient pressure, ambient temperature, and humidity of the oxidant feed gas as a single device. In some embodiments an oxidant gas inlet sensor 24 may measure ambient pressure, ambient temperature, oxidant mass flow rate and/or humidity of the oxidant feed gas as a single device. In some embodiments, additional oxidant gas inlet sensors 24 may be utilized to measure other properties of the incoming oxidant feed gas. For example, in some embodiments an oxidant gas inlet sensor may be configured to measure oxidant gas composition or levels of polluting species such as carbon monoxide, ammonia, sulfur, volatile organic compounds, and/or other species that could be detrimental to the fuel cell operation or life.

Electrochemical cell system 100 may also include one or more oxidant gas exhaust sensors 26 positioned along oxidant gas exhaust line 34B. For example, as depicted in FIG. 2, oxidant gas outlet exhaust sensors 26 may include at least a first oxidant gas exhaust sensor 26A for measuring the pressure of the oxidant gas exhausted from electrochemical cell 10 through oxidant gas exhaust line 34B. In some embodiments, additional oxidant gas exhaust sensors 24 may be utilized to measure other properties of the oxidant gas exhausted from electrochemical cell 10. For example, system 100 may include a second oxidant gas exhaust sensor 26B for measuring the humidity of the oxidant gas exhausted from electrochemical cell 10. In other embodiments, oxidant gas exhaust sensors for measuring the flow rate, temperature, or composition of the oxidant gas exhausted from electrochemical cell 10 may be utilized by system 100.

Although not show in FIG. 1, in some embodiments of system 100, fuel gas inlet line 36A may include one or more fuel gas inlet sensors. These sensors may be configured to measure, for example, temperature, pressure, relative humidity, flow rate, and the like of the fuel feed gas supplied to electrochemical cell 10. Similarly, fuel gas exhaust line 36B may include one or more fuel gas exhaust outlet sensors (not shown). These sensors may be useful for measuring, for example, temperature, pressure, relative humidity, flow rate, and the like of the fuel gas exhausted from electrochemical cell 10.

As discussed above, electrical current is generated by cell 10 and supplied to electrical load 30 via current circuit 28. The electrical current may be measured by, for example, a current transducer 46 connected to current circuit 28. In some embodiments, current transducer 46 may be, e.g., a Hall-effect sensor or a shunt sensor. In some embodiments, resistance across electrochemical cell 10, electrical circuit 28, and/or an electrochemical cell stack can be determined by measuring the cell or stack voltage in response to small changes in current. For example, the current can be perturbed using a high frequency, typically greater than 1000 Hz, waveform (sinusoid, triangle, square, or other waveform) or as a step change by quickly connecting or disconnecting a load on the fuel cell stack (such as an electric heater or similar device, "current-interrupt" method). The resulting change in cell or stack voltage divided by the imposed change in current is generally proportional to resistance according to Ohm's Law. The specific voltage-current-resistance relationship for a particular fuel cell design can be determined experimentally. Various models for electrochemical cells are known to those skilled in the art and can be employed to transform measured voltage and current changes into a resistance value meaningful for determining the hydration state of the cell.

System 100 may include a controller 40 as depicted in FIG. 1. Controller 40 may be configured to communication with all the sensors of system 100, including for example, coolant inlet sensor 20, coolant exhaust sensor 22, oxidant gas inlet sensors 24 (e.g., 24A, 24B, 24C, 24D), and first oxidant gas exhaust sensor 26A. Controller 40 may be configured to receive signals from each sensor indicative of the measured value of the corresponding sensor. Controller 40 may also be configured to communicate (e.g., send signals to and receive signals from) with current transducer 46, compressor 42, an oxidant gas inlet sensor 24B, coolant inlet sensor 20, and/or a coolant pump 44.

During operation of system 100 the amount of water entering the cell plus the amount of water generated by the cell should be kept in exact balance with the amount of water leaving the cell in order to avoid water stored in the cell from either increasing (i.e., moving toward a flooded condition) or decreasing (i.e., moving toward a dry-out condition). If the cell is operated where the water stored in the cell is either increasing or decreasing for too long, the cell may become flooded or dried-out to the point where cell performance is reduced or the cell is no longer able to operate. Although it is desirous to maintain water entering the cell plus water generated by the cell in perfect balance with water exiting the cell, environmental and operating conditions, measurement errors inherent to the physical system sensors, and/or physical limitation of the hardware used in the system may prevent continuous water balance and result in a non-zero amount of accumulated water stored within the cell. This non-zero amount could be a positive amount, indicating more water is stored than desired (i.e., tending toward flooding) or a negative amount, indicating less water is stored than desired (i.e., tending toward dry-out).

To address this issue, the present disclosure provides a system and method for tracking the cumulative water imbalance (e.g., value) over time and adjusting the operating conditions of the cell to return this cumulative water balance to zero once the system is able to do so. The disclosed method may include determining a present water imbalance in electrochemical cell 10 by summing an amount of water introduced by the oxidant feed gas, which may be referred to as water$_{in}$ ($\dot{n}_{in}$ mole/second) and an amount of water created by the electrochemical reaction, which may be referred to as water$_{created}$ ($\dot{n}_{create}$, mole/second), less an amount of water discharged from cell 10 by the oxidant exhaust gas, which may be referred to as water$_{out}$ ($\dot{n}_{out}$, mole/second). Therefore, the real-time water balance at a given movement may be reflected by Equation 1:

$$\text{Water}_{in}(\dot{n}_{in}) + \text{Water}_{created}(\dot{n}_{create}) - \text{Water}_{out}(\dot{n}_{out}) = \dot{n} \quad \text{(Equation 1)}$$

where $\dot{n}$ represents the instantaneous water imbalance (mole/second) and $\dot{n}_{in}$, $\dot{n}_{create}$, and $\dot{n}_{out}$ are as defined above. When $\dot{n}$ equals zero, the water flow (mole/second) at that given moment may be considered balanced. When Equation 1 is not equal to zero, there may be a water imbalance. For example, when $\dot{n}$ is greater than zero, the amount of water in electrochemical cell 10 may be increasing, while when $\dot{n}$ is less than zero, the amount of water in electrochemical cell 10 may be decreasing. The cumulative water imbalance, N, can thus be calculated as a function of time:

$$N = \Sigma_{time} \dot{n} \quad \text{(Equation 2)}$$

According to an exemplary embodiment, the amount of water in electrochemical cell 10 may be tracked during operation. Tracking the cumulative water imbalance may include repeatedly determining the present water imbalance and continuing to sum the results during operation. The cumulative water balance (mole) over a period of time may be represented by Equation 3:

$$\int_{t=0}^{\infty} (\dot{n}_{in} + \dot{n}_{create} - \dot{n}_{out}) \, dt = 0 \quad \text{(Equation 3)}$$

which may be rewritten as:

$$\int_{t=0}^{\infty} \left( \dot{n}_{H_2O}^S + \dot{n}_{H_2O}^C - \dot{n}_{H_2O}^E \right) dt = 0 \quad \text{(Equation 4)}$$

where $\dot{n}_{water}^S$ represents $\dot{n}_{in}$, $\dot{n}_{water}^C$ represents $\dot{n}_{create}$, and $\dot{n}_{H_2O}^E$ represents $\dot{n}_{out}$ (all mole/second).

The amount of water introduced into the electrochemical cell, $\dot{n}_{H_2O}^S$, may be calculated from the measurement of oxidant mass flow rate, ambient temperature, ambient pressure and ambient relative humidity as shown in Equations 5-7:

$$\dot{n}_{H_2O}^S = f_{H_2O}^S \cdot \dot{n}_{wet}^S \quad \text{(Equation 5)}$$

$$\dot{n}_{wet}^S = \frac{\dot{m}^S}{\mu^S(T^S, RH^S)} \quad \text{(Equation 6)}$$

$$f_{H_2O}^S = RH^S \cdot \frac{p_{H_2O}(T^S)}{p^S} \quad \text{(Equation 7)}$$

Equations 6 and 7 may be incorporated into equation 5, thereby enabling the amount of water introduced into the electrochemical cell, $\dot{n}_{H_2O}^S$, to be calculated by the equation 8:

$$\dot{n}_{H_2O}^S = RH^S \cdot \frac{p_{H_2O}(T^S)}{p^S} \cdot \frac{\dot{m}^S}{\mu^S(T^S, RH^S)} \quad \text{(Equation 8)}$$

Symbol $RH^S$ represents the relative humidity of the oxidant feed gas supplied to cell 10, which may be measured by third oxidant gas inlet sensor 24C. Symbol $p^S$ represents the pressure of the oxidant feed gas supplied to cell 10, which may be measured by first oxidant gas inlet sensor 24A.

Symbol $p_{H_2O}(T^S)$ represents the vapor pressure of water evaluated at temperature $T^S$, which is a fixed property for water and is a function of temperature. Symbol $\dot{m}^S$ may represent the mass flow rate (grams/second) of oxidant gas supplied to electrochemical cell 10, and $\mu^S$ is the molecular weight (g/mole) of the wet oxidant gas, which may be a function of temperature, pressure and relative humidity of the oxidant gas. Thus, system 100 and controller 40 may be configured to calculate the amount of water (mole/second) introduced into the electrochemical cell, $\dot{n}_{H_2O}^S$, based on the measured values provided by oxidant gas inlet sensors 24.

The amount of water created, $\dot{n}_{H_2O water}^C$ (mole/second), may be calculated using the equation 9:

$$\dot{n}_{H_2O}^C = St_A \cdot \frac{i}{2F} \quad \text{(Equation 9)}$$

where i represents current (Amps, e.g., measured by current transducer 46), F is the Faraday constant (96485.3 C/mol), and $St_A$ is the effective anode stoichiometric ratio representing quantity of hydrogen fuel supplied to the cell divided by the quantity of hydrogen fuel needed to generate the measured current i. $St_A$ is a parameter determined by the fuel cell system and control design and accounts for hydrogen fuel "wasted" through anode purging to the cathode stream, hydrogen fuel cross-over from the anode to the cathode and/or other similar transfer of hydrogen fuel to the cathode that may be inherent to the system.

The amount of water discharged from the electrochemical cell 10 via exhaust oxidant gas may be calculated by Equation 10:

$$\dot{n}_{H_2O}^E = RH^E \cdot \frac{p_{H_2O}(T^E)}{p^E} \cdot \dot{n}_{total}^E \quad \text{(Equation 10)}$$

where $RH^E$ represents the humidity of the oxidant gas exhausted from electrochemical cell 10. When N (i.e., solution to Equation 1) is greater than or equal to zero, $RH^E$ may equal 100%. When N is less than zero, an estimate of $RH^E$ may be determined utilizing a model, which is described in further detail herein. Symbol $p^E$ represents the pressure of the oxidant gas discharged from electrochemical cell 10 through oxidant gas exhaust line, which may be measured my first oxidant gas exhaust sensor 26A. Symbol $p_{H2O}(T^E)$ represents the vapor pressure of water, which is a fixed property for water and is a function of temperature. The temperature utilized to determine $p_{H_2O}(T^E)$ may be the coolant outlet temperature ($T^E$) measured by coolant exhaust sensor 22. Symbol, $\dot{n}_{total}^E$ represents total flow of non-water species in the oxidant exhaust gas, which may be calculated by Equation 11:

$$\dot{n}_{total}^E = \left(\dot{n}_B^S + \dot{n}_{O_2}^S - \frac{1}{2}\dot{n}_{H_2O}^C\right) \quad \text{(Equation 11)}$$

wherein $\dot{n}_{O_2}^S$ may be calculated by Equation 12:

$$\dot{n}_{O_2}^S = (0.20946)(1 - f_{H_2O}^S) \cdot \dot{n}_{wet}^S \quad \text{(Equation 12)}$$

while $\dot{n}_{O_2}^S$ may be calculated by Equation 12:

$$\dot{n}_B^S = (0.79054)(1 - f_{H_2O}^S) \cdot \dot{n}_{wet}^S \quad \text{(Equation 13)}.$$

As discussed above, when N (i.e., solution to Equation 2) is greater than or equal to zero, $RH^E$ may equal to 100%.

When N is less than zero, an estimate of $RH^E$ may be determined utilizing a model, for example, $RH^E$ may be derived from experimental data whereby $RH^E$ may correspond with peak performance of cell 10. For example, operating characteristics of an electrochemical cell could be monitored over a range of temperatures and flow rates to determine a correlation between $RH^E$ and electrochemical cell performance. With $RH^E$, Equation 1 may be solved for $\dot{n}_{wet}^S$, which results in Equation 14 and represents the oxidant flow rate that will result in water balanced operation of the cell:

$$\dot{n}_{wet}^S = \frac{\left[1 + \frac{f^E}{2(1-f^E)}\right] \cdot \frac{St_A \cdot i}{2F}}{\left[\frac{f^E(1-f^S)}{(1-f^E)} - f^S\right]} \quad \text{(Equation 14)}$$

where $St_A$ is the anode stoich, $f^E$ is the mole fraction of the oxidant exhaust flow that is water $$RH^E \cdot \frac{p_{H_2O}(T^E)}{p^E}$$

and $f^S$ is the mole fraction of the oxidant inlet flow that is water $$RH^S \cdot \frac{p_{H_2O}(T^S)}{p^S}.$$

Equation 14 may be utilized to determine an oxidant gas flow rate for balancing the water flow within the cell.

Controller 40 may be configured to execute one or more of the calculations as described herein, based on the properties measured by one or more of the sensors (e.g., coolant inlet sensor 20, coolant exhaust sensor 22, oxidant gas inlet sensors 24, oxidant gas exhaust sensor 26, and current transducer 46) enabling calculation of a target oxidant feed gas flow rate that balances the water flow rate within the cell. Controller 40 may be configured to then adjust the oxidant feed gas flow rate or send a signal to another controller or engine that sets the oxidant feed gas flow rate. In some embodiments, controller 40 may be configured to utilize a PID controller to adjust the oxidant feed gas flow rate. The adjustment of oxidant feed gas flow rate may be configured to bring the cumulative water imbalance to zero or about zero. In some embodiments, controller 40 may be configured such that adjustment of the oxidant feed gas flow rate is away from a water-balanced flow rate when the cumulative water balance deviates from zero beyond a set threshold. For example, if N is greater than zero (i.e., excess stored water in the cell) the controller may adjust oxidant feed gas flow rate to a value greater than a water-balance flow rate in order to proactively create a net drying condition to remove water from the cell and bring N toward zero. Conversely, if N is less than zero (i.e., lack of stored water in the cell) the controller may adjust oxidant feed gas flow rate to a value less than a water-balance flow rate in order to proactively create a net flooding condition to add water to the cell and bring N toward zero.

The determination of the present water imbalance as described herein may be repeated by controller 40 at a set frequency. For example, controller 40 may be configured to repeat the determination at a frequency of about 0.01 seconds, about 0.1 seconds, about 0.5 seconds, about 1 second, about 2 seconds, about 3 seconds, about 4 seconds, about 5 seconds, about 10 seconds, about 20 seconds, about 30 seconds, or about 60 seconds.

As illustrated in FIG. 1, coolant may be circulated through electrochemical cell 10 in order to control the temperature of electrochemical cell 10. In some embodiments, the coolant may be supplied to electrochemical cell 10 at a generally fixed inlet coolant temperature. Under certain conditions, if the cell is not sufficiently cooled, the water imbalance in the cell could reach a point where the oxidant feed gas flow rate needed to bring the water imbalance back to zero is beyond the limits of system 100 (e.g., beyond the output capacity of compressor 42). In order to avoid this situation, the inlet coolant temperature may be set based on a set of ambient conditions (e.g., air temperature, pressure, and humidity) so that the maximum oxidant feed gas flow rate (result of Equation 14) needed to bring the cumulative water imbalance to zero is within the operating limits of compressor 42, which is generating the oxidant feed gas flow.

In some embodiments, coolant pump 44, which supplies coolant to electrochemical cell 10 may be configured to operate at a generally fixed speed. This will allow the coolant outlet temperature to vary with the fuel cell power. By setting the coolant inlet temperature and setting a constant speed for coolant pump 44, the associated pump hardware and control hardware needed for controlling coolant pump 44 may be simplified.

In some embodiments, system 100 and controller 40 may be configured to periodically recalibrate the cumulative water imbalance to zero. For example, controller 40 may be configured to increase the flow rate of oxidant feed gas to temporarily dry out electrochemical cell 10. While doing this, controller 40 may be configured to measure a resistance across cell 10. In some embodiments, the resistance may be measured using a current-interrupt method or other methods described herein. Controller 40 may be configured to determine when the measured resistance is about equal to a target resistance that corresponds to the cumulative water imbalance being equal to zero and then reset the cumulative water imbalance variable in the controller software to zero. This process allows accumulated errors in the water imbalance calculation (due in part to errors in the measurement used in the equations set forth above) to be corrected for with a direct measurement of water level (i.e., resistance of the cell). This process of recalibration may be done periodically when the system load can be controlled, for instance, during a system shutdown. In some embodiments, during recalibration, oxidant flow rates greater than a water-balanced flow rate may be provided to the cell in order to purposefully dry out the cell while monitoring for an increase in resistance, stopping the shutdown once a target value is achieved, and resetting the cumulative water imbalance by, for example, resetting the cumulative water imbalance variable in the controller software to zero. The target value may be an absolute value of resistance or it may be a relative increase in resistance from the start of the shutdown process. The target relative increase may be, for example, between about 0.5% and about 300%, between about 0.5% and about 200%, between about 0.5% and about 100%, between about 1.0% and about 50%, or between about 5% and about 25%. In some embodiments, an absolute value of target resistance may be determined during initial startup of electrochemical cell 10.

In some embodiments, system 100 and controller 40 may recalibrate the cumulative water imbalance to zero by measuring a humidity of the oxidant exhaust gas. For example, controller 40 may increase the flow rate of oxidant feed gas temporarily to dry out electrochemical cell 10. While doing this, controller 40 may be configured to measure a humidity of the oxidant exhaust gas (e.g., measured by second oxidant gas exhaust humidity sensor 26B). Controller 40 may be configured to determine when the humidity of the oxidant exhaust gas is within a target humidity that corresponds to a cumulative water imbalance of zero and reset the cumulative water imbalance to zero. The target humidity may be, for example, between about 50% and about 99%, between about 60% and about 99%, between about 70% and about 99%, between about 80% and about 99%, between about 90% and about 99%, between about 50% and about 90%, between about 60% and about 90%, between about 70% and about 90%, between about 80% and about 90%, between about 50% and about 80%, between about 60% and about 80%, between about 70% and about 80%, or between about 75% and about 80%.

In some embodiments, system 100 may be configured to conduct a recalibration based on both the measured resistance and measured humidity of the oxidant gas exhausted by electrochemical cell 10. In some embodiments, system 100 may be configured to conduct a recalibration at a set frequency. For example, system 100 may be configured to conduct a recalibration at least once per day or at least once every other day. In some embodiments, recalibration may occur once per day, once every two days, once every three days, once per week, once every two weeks, once per month, once every two months, once every six months, or once every year. In some embodiments, the recalibration can be determined based on the run time of electrochemical cell. For example, recalibration may be initiated after a run time of about 1 hour, about 2 hours, about 3 hours, about 4 hours, about 5 hours, about 10 hours, about 15 hours, about 25 hours, about 50 hours, about 100 hours, about 200 hours, or about 500 hours. In some embodiments, recalibration may be conducted during a shutdown sequence for system 100. In some embodiments, recalibration is conducted during every shutdown sequence for system 100. In some embodiments, recalibration is conducted during every other shutdown sequence for system 100. In some embodiments, recalibration is conducted once every two, three, four, five, six, seven, eight, nine, ten, fifteen, twenty, twenty-five, or thirty shutdown sequences.

In some embodiments, system 100 may include a fixed orifice positioned in the oxidant exhaust gas line. In some embodiments, this orifice may result in achievement of a target cathode exhaust pressure at full power while maintaining passive control (i.e., no active moving parts).

FIG. 2 illustrates an exemplary process performed by controller 40 during operation of system 100 that controls the water balance in electrochemical cell 10. As illustrated in the flowchart of FIG. 2, activation of the water imbalance control may be initiated with activation of electrochemical cell 10 (Step 202). From step 202, controller 40 may begin tracking the current measurement passing through the current circuit and the measured properties of the oxidant gas and coolant circulating through electrochemical cell 10 (Step 204) by receiving signals from the various sensors (e.g., oxidant gas inlet sensors 24, coolant inlet sensor 20, coolant outlet sensor 22, and oxidant gas exhaust sensor(s) 26, current transducer 46). Controller 40 may be configured to track these properties of electrochemical cell 10 continuously or repeat the tracking at a periodic frequency.

From step 204, controller 40 may begin determining the present water imbalance in the electrochemical cell 10 (Step 206). Step 206 may include summing a water$_{in}$ and a water$_{created}$ less a water$_{out}$. As explained herein, water$_{in}$ may represent an amount of water introduced into the electrochemical cell by an oxidant feed gas, water$_{created}$ may represent an amount of water created by the electrochemical cell from the electrochemical reaction, and water$_{out}$ may represent an amount of water discharged from the electrochemical cell by an oxidant exhaust gas. The measured properties, values, and equations that may be used to calculate water$_{in}$, water$_{created}$, and water$_{out}$ are explained herein. Controller 40 may be configured to determine the present water imbalance continuously or repeat the determination at a periodic frequency, for example, after each measurement of the properties (Step 204).

From step 206, controller 40 may then track a cumulative water imbalance of electrochemical cell 10 (Step 208). Step 208 may include repeatedly determining the present water imbalance and summing the results during operation of electrochemical cell 10. The equation that may be used to sum the present water imbalance in order to track a cumulative water imbalance are explained herein. From step 208, controller 40 may then determine whether the cumulative water imbalance deviates from zero (Step 210). If the cumulative water imbalance has not deviated from zero (e.g., about equal to zero) or is within a set allowable threshold of zero (Step 210: No), controller 40 may return to step 204 and repeat the process. In some embodiments, the cumulative water imbalance can deviate up to 0.1 grams water/cell, up to 0.2 grams water/cell, up to 0.5 grams water/cell, up to 1.0 grams water/cell, up to 2.0 grams water/cell, or up to 5.0 grams water/cell from zero and still be considered within an allowable threshold of zero. If the cumulative water imbalance has deviated from zero (i.e., not equal to zero) or is outside a set allowable threshold of zero (Step 210: Yes), controller 40 may proceed to step 212. Step 212 may include adjusting the flow rate of the oxidant feed gas entering electrochemical cell 10 based on the cumulative water imbalance. As part of step 212, controller 40 may calculate an acceptable flow rate for the oxidant feed gas in order to bring the cumulative water imbalance to zero within a predetermined amount of time. In some embodiments, controller 40 may utilize a PID loop to control the adjustment. In some embodiments, from step 212 controller 40 may return to step 202 and repeat the process until electrochemical cell is shutdown or water imbalance mode is deactivated.

Figure 3:
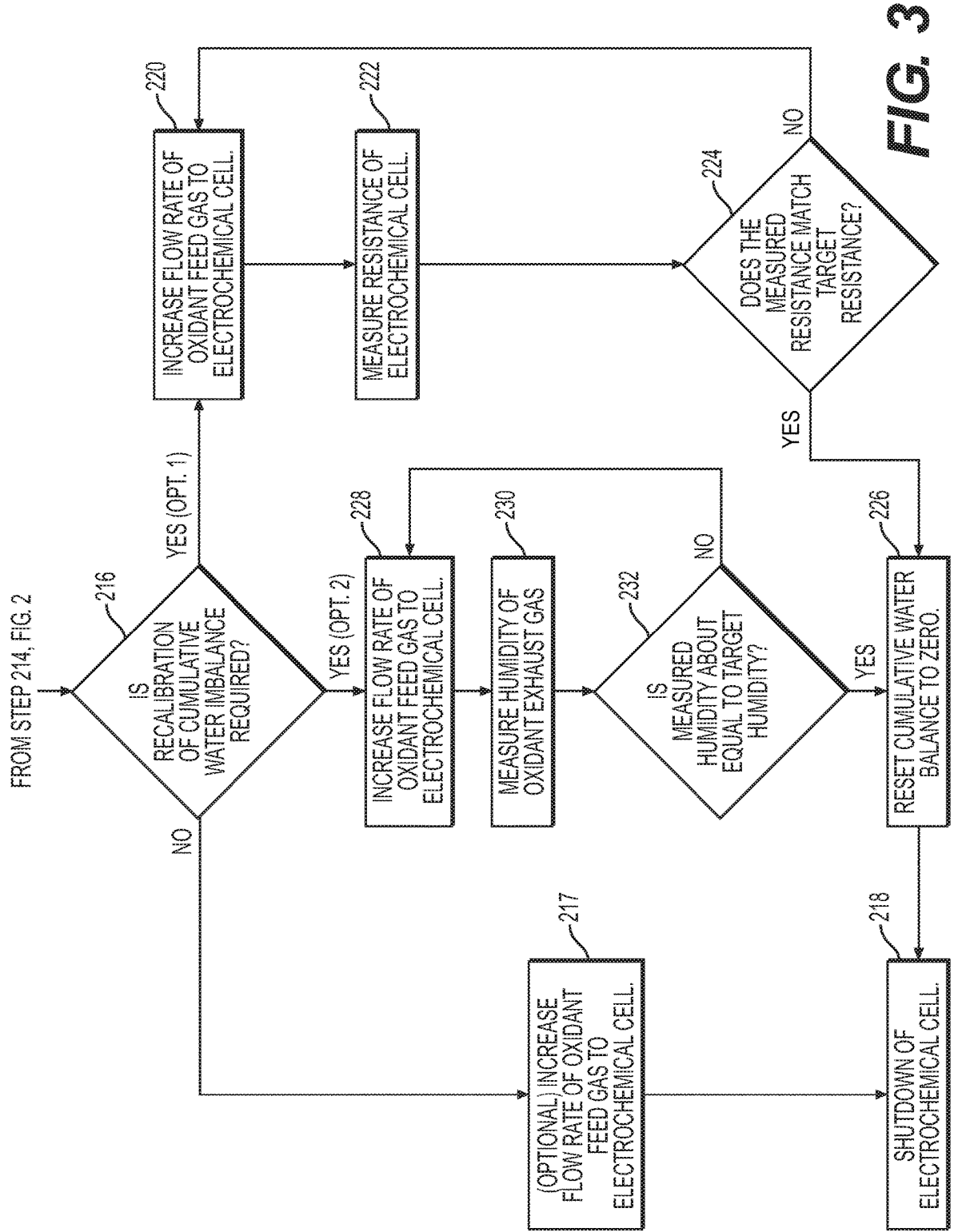
FIG. 3 is a continuation of the flow diagram of FIG. 2, illustrating a method of controlling water imbalance in an electrochemical cell system, according to an exemplary embodiment.

In some embodiments, as illustrated in FIG. 2, between step 212 and step 204 controller 40 may determine whether a shutdown of electrochemical cell was initiated (Step 214). If no shutdown was initiated (Step 214: No), controller 40 may return to step 204. If a shutdown was initiated (Step 214: Yes), controller 40 may then determine whether a recalibration of the cumulative water imbalance is called for before shutdown (Step 216) as illustrated on FIG. 3. If a recalibration is not called for (Step 216: No) (e.g., a recalibration was recently performed), controller 40 may proceed with the shutdown of electrochemical cell 10 (Step 218). In some embodiments, between step 216 and step 218, controller 40 may increase the flow rate of oxidant feed gas to electrochemical cell (optional Step 217) for a duration of time in order to perform a baseline purge of the cathode side of electrochemical cell 10. The duration of step 217 may be fixed (e.g., at a value between about 1 second and about 30 seconds, preferably 15 seconds or less) or in some embodiments a variable duration that is determined by controller 40.

For example, in some embodiments, controller 40 may determine the duration of step 217 based on one or more measured or calculated parameters (e.g., oxidant gas inlet mass flow rate, oxidant gas inlet ambient temperature, oxidant gas inlet ambient pressure, oxidant gas inlet ambient relative humidity, coolant inlet temperature, coolant outlet temperature, oxidant gas exhaust temperature, oxidant gas exhaust pressure, oxidant gas exhaust relative humidity, or cumulative water imbalance value.

If a recalibration is called for (Step 216: Yes), in some embodiments (e.g., Opt. 1), controller 40 may initiate a recalibration procedure that begins with increasing the flow rate of oxidation feed gas to electrochemical cell 10 temporarily in order to dry out electrochemical cell 10 (Step 220). From step 220, controller 40 may begin measuring a resistance of electrochemical cell 10 (Step 222). From step 222, controller 40 may determine whether the measured resistance is about equal to a target resistance that corresponds to the cumulative water imbalance being equal to zero (Step 224). If the resistance measured has not reached the target resistance within a predetermined shutdown time (Step 224: No), controller 40 may return to step 220 and continue the flow of oxidant feed gas to electrochemical cell 10 at the same flow rate or increase the flow rate further. If the resistance measured has reached the target resistance within the predetermined shutdown time (Step 224: Yes), controller 40 may then reset the cumulative water imbalance variable to zero (Step 226). From step 226, controller 40 may then continue with the shutdown of electrochemical cell 10 (Step 218).

In an alternate embodiment of Opt. 1 (not shown in FIG. 3), controller 40 may determine when to reset the cumulative water imbalance value based on an increase in the measured resistance rather than based on a target resistance value. For example, if shutdown was initiated and recalibration is called for, controller 40 may determine whether the measured resistance increased relative to a baseline resistance measured at the initiation of shutdown. The change in resistance may be determined by calculating the difference between the measured resistance value and the baseline resistance, divided by the baseline resistance (i.e., ((measured resistance)−(baseline resistance))/(baseline resistance). If the resistance has increased by, e.g., between about 0.5% and about 300%, between about 0.5% and about 200%, between about 0.5% and about 100%, between about 1.0% and about 50%, or between about 5% and about 25% relative to the baseline resistance measured at the initiation of shutdown within the predetermined shutdown time, controller 40 may then reset the cumulative water imbalance variable to zero. If the resistance has not increased the target amount within the predetermined shutdown time, controller 40 may return to the increased flow rate step and continue the flow of oxidant feed gas to electrochemical cell 10 at the same flow rate or increase the flow rate further.

In other embodiments (e.g., Opt. 2), if a recalibration is called for (Step 216: Yes), controller 40 may initiate a recalibration procedure that begins with increasing the flow rate of oxidant feed gas to electrochemical cell 10 temporarily in order to dry out electrochemical cell 10 (Step 228). From step 228, controller 40 may begin measuring a humidity of the oxidant exhaust gas (Step 230). From step 230, controller 40 may determine whether the measured humidity is about equal to a target humidity that corresponds to the cumulative water imbalance being equal to zero (Step 232). If the measured humidity has not reached the target humidity within the predetermined shutdown time (Step 232: No), controller 40 may return to step 228 and continue the flow of oxidant feed gas to electrochemical cell 10 at the same flow rate or increase the flow rate further. If the measured humidity has reached the target humidity within the predetermined shutdown time (Step 232: Yes), controller 40 may then reset the cumulative water imbalance variable to zero (Step 226). From step 226, controller 40 may continue with shutting down electrochemical cell 10 (Step 218). The predetermined shutdown time may be fixed or variable, in which case it may be determined based on one or more variables (e.g., cumulative water imbalance, maximum oxidant flow rate, operational time restraints for system 100). The predetermined shutdown time may range from, e.g., less than or about 1 second to about 20 minutes. For example, the predetermined shutdown time may be about 1 second, about 2 seconds, about 3 seconds, about 4 seconds, about 5 seconds, about 10 seconds, about 15 seconds, about 20 seconds, about 30 seconds, about 40 seconds, about 50 seconds, about 60 seconds, about 75 seconds, about 90 seconds, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, or about 20 minutes.

In some embodiments, controller 40 may be configured such that the initial magnitude of the increase in flow rate of oxidant feed gas (e.g., at steps 220 and 228) may be fixed along with the predetermined shutdown time (e.g., an optimized predetermined shutdown time). If controller 40 is unable to achieve recalibration to zero (i.e., step 226) within the fixed predetermined shutdown time, controller 40 may return to step 220 or 228 and continue the same flow rate or increase the flow rate of oxidant to accelerate the recalibration and shutdown process. The magnitude of this increase may be determined based on, for example, the speed at which system 100 is trying to complete shutdown or the cumulative water imbalance value at initiation of shutdown or at the time controller 40 returned to step 228 or 220.

In some embodiments, controller 40 may be configured to call for an excess increase in flow rate based on the cumulative water imbalance at the time of initiation of the shutdown sequence. The controller 40 may be configured to determine the increase in flow rate based the predetermined shutdown time and the maximum oxidant flow rate. For example, controller 40 may be configured to try and optimize (e.g., minimize) the predetermined shutdown time by increasing the oxidant flow rate to achieve recalibration to zero (reach step 226) within the optimized predetermined shutdown time. The increase in flow rate of oxidant gas to electrochemical cell 10 may be based on the calculated water balance (e.g., ((predetermined water balance value)–(calculated water balance value))/(calculated water balance value)). In some embodiments, the increase in flow rate of oxidant gas may range from about 5% to about 500%, from about 25% to about 400%, about 50% to about 300%, or about 75% to about 200%. In some embodiments, the increase in flow rate of oxidant gas may be at least 5%, at least 10%, at least 15%, at least 20%, at least 25%, at least 30%, at least 35%, at least 40%, at least 45%, at least 50%, at least 75%, at least 100%, at least 125%, at least 150%, at least 175%, at least 200%, at least 225%, at least 250%, at least 275%, at least 300%, at least 325%, at least 350%, at least 375%, at least 400%, at least 425%, at least 450%, at least 475%, or at least 500%. In certain situations (e.g., if the cumulative water imbalance is high indicating electrochemical cell is more flooded), the excess increase in flow rate called for may exceed the maximum oxidant flow rate (e.g., limit of compressor 42), in which case it may not be possible to achieve recalibration to zero within the optimized predetermined shutdown time. Thus, controller 40 may have to allow for additional shutdown time (e.g., by returning to steps 220 or 228).

OTHER EMBODIMENTS

Embodiment 1

A method of controlling water imbalance in an electrochemical cell, comprising:
  determining a present water imbalance in the electrochemical cell by summing a $water_{in}$ and a $water_{created}$ less a $water_{out}$, wherein:
    $water_{in}$ is an amount of water introduced into the electrochemical cell by an oxidant feed gas;
    $water_{created}$ is an amount of water created by the electrochemical cell from the electrochemical reaction; and
    $water_{out}$ is an amount of water discharged from the electrochemical cell by an oxidant exhaust gas;
  tracking a cumulative water imbalance during operation of the electrochemical cell by repeatedly determining the present water imbalance and continuing to sum the results during operation;
  adjusting a flow rate of the oxidant feed gas entering the electrochemical cell based on the cumulative water imbalance.

Embodiment 2

The method according to embodiment 1, wherein adjustment of the flow rate of the oxidant feed gas is controlled using a proportional-integral-derivative (PID) controller.

Embodiment 3

The method according to embodiment 1 or 2, wherein the flow rate of the oxidant feed gas is adjusted when the cumulative water imbalance deviates from zero in order to bring the cumulative water imbalance to zero.

Embodiment 4

The method according to any one of embodiments 1 to 3, wherein the flow rate of the oxidant gas entering the electrochemical cell is adjusted when the cumulative water balance deviates from zero beyond a set threshold.

Embodiment 5

The method according to any one of embodiments 1 to 4, wherein the determination of the present water imbalance is repeated at least every 30 seconds.

Embodiment 6

The method according to any one of embodiments 1 to 5, wherein a coolant is supplied to the electrochemical cell at a generally fixed inlet coolant temperature, wherein the inlet coolant temperature is set based on a set of ambient conditions in a way that ensures a potential maximum oxidant gas flow rate needed to bring the cumulative water imbalance to zero is within the operating limits of a compressor supplying the oxidant feed gas flow.

Embodiment 7

The method according to embodiment 6, wherein the coolant is supplied to the electrochemical cell from a coolant pump that is operating at generally fixed speed.

Embodiment 8

The method according to embodiment 6, wherein the set of ambient conditions include air temperature, pressure, and humidity.

Embodiment 9

The method according to any one of embodiments 1 to 8, further comprising recalibrating the cumulative water imbalance to zero by:
increasing the flow rate of oxidant feed gas to the electrochemical cell temporarily in order to dry out the electrochemical cell;
measuring a resistance of the electrochemical cell;
determining whether the resistance measured is about equal to a target resistance that corresponds to the cumulative water imbalance being equal to zero; and
resetting the cumulative water imbalance to zero when the resistance measured is about equal to the target resistance.

Embodiment 10

The method according to embodiment 9, wherein the resistance is measured using a current-interrupt method.

Embodiment 11

The method according to embodiment 9 or 10, wherein the target resistance is determined during initial startup testing of the electrochemical cell.

Embodiment 12

The method according to any one of embodiments 9 to 11, wherein the target resistance is between about 50 and about 100 mΩ-cm$^2$.

Embodiment 13

The method according to any one of embodiments 1 to 8, further comprising recalibrating the cumulative water imbalance to zero by:
measuring a baseline resistance of the electrochemical cell;
increasing the flow rate of oxidant feed gas to the electrochemical cell temporarily in order to dry out the electrochemical cell;
measuring a present resistance of the electrochemical cell;
determining whether the present resistance measured has increased relative to the baseline resistance; and
resetting the cumulative water imbalance to zero when the present resistance measured has increased by between about 0.5% and about 300% compared to the baseline resistance.

Embodiment 14

The method according to embodiment 13, wherein the change in resistance from the baseline resistance to the present resistance is about 25%.

Embodiment 15

The method according to embodiment 13 or 14, wherein recalibrating of the cumulative water imbalance to zero is performed at least once per day during a shutdown sequence for the electrochemical cell.

Embodiment 16

The method according to any one of embodiments 1 to 8, further comprising recalibrating the cumulative water imbalance to zero by:
increasing the flow rate of oxidant feed gas to the electrochemical cell temporarily in order to dry out the electrochemical cell;
measuring a humidity of the oxidant exhaust gas;
determining whether the measured humidity of the oxidant exhaust gas is about equal to a target humidity that corresponds to a cumulative water imbalance of zero; and
resetting the cumulative water imbalance to zero when the measured humidity is about equal to the target humidity.

Embodiment 17

The method according to embodiment 16, wherein the target humidity is between about 50% and about 99%.

Embodiment 18

The method according to any one of embodiments 1 to 17, further comprising controlling a pressure of the oxidant exhaust gas at full power using a fixed orifice positioned in an oxidant exhaust gas line.

Embodiment 19

The method according to any one of embodiments 1 to 18, wherein the water$_{in}$ is determined based on a humidity of the oxidant feed gas, a pressure of the oxidant feed gas, and the flow rate of the oxidant feed gas.

Embodiment 20

The method according to any one of embodiments 1 to 19, wherein the water$_{created}$ is determined based on a current generated by the electrochemical cell and an anode stoichiometric ratio.

Embodiment 21

The method according to any one of embodiments 1 to 20, wherein the water$_{out}$ is determined based on a humidity of an oxidant exhausted gas and a pressure of the oxidant exhausted gas.

Embodiment 22

An electrochemical cell system, comprising:
an electrochemical cell;
a plurality of oxidant gas inlet sensors, an oxidant gas exhaust sensor, a coolant inlet sensor, a coolant exhaust sensor, and current transducer;

a controller configured to:
  determine a present water imbalance in the electrochemical cell by summing a $water_{in}$ and a $water_{created}$ less a $water_{out}$, wherein:
    $water_{in}$ is an amount of water introduced into the electrochemical cell by an oxidant feed gas;
    $water_{created}$ is an amount of water created by the electrochemical cell from the electrochemical reaction; and
    $water_{out}$ is an amount of water discharged from the electrochemical cell by an oxidant exhaust gas;
  track a cumulative water imbalance during operation of the electrochemical cell by repeatedly determining the present water imbalance and continuing to sum the results during operation; and
  adjust a flow rate of the oxidant feed gas entering the electrochemical cell based on the cumulative water imbalance.

Embodiment 23

The electrochemical cell system of embodiment 22, the controller is configured to use a PID loop to adjust the flow rate of the oxidant feed gas.

Embodiment 24

The electrochemical cell system of embodiment 22 or 23, wherein the controller is configured to adjust the flow rate of the oxidant feed gas when the cumulative water imbalance deviates from zero in order to bring the cumulative water imbalance to zero.

Embodiment 25

The electrochemical cell system of any one of embodiments 22 to 24, wherein the controller is configured to adjust the flow rate of the oxidant gas when the cumulative water balance deviates from zero beyond a set threshold.

Embodiment 26

The electrochemical cell of any one of embodiments 22 to 25, wherein the controller is configured to repeat the determination of the present water imbalance at least every 30 seconds.

Embodiment 27

The electrochemical cell of any one of embodiments 22 to 26, wherein the controller is configured to adjust the flow rate of the oxidant feed gas repeatedly at a frequency of at least 1 Hz.

Embodiment 28

The electrochemical cell of any one of embodiments 22 to 27, further comprising a coolant pump configured to supply a coolant to the electrochemical cell at a generally fixed inlet coolant temperature, wherein the inlet coolant temperature is set based on a set of ambient conditions in a way that ensures a potential maximum oxidant gas flow rate needed to bring the cumulative water imbalance to zero is within the operating limits of a compressor configured to supply the oxidant feed gas flow.

Embodiment 29

The electrochemical cell of embodiment 28, wherein the coolant pump is operated at a generally fixed speed.

Embodiment 30

The electrochemical cell of embodiment 28, wherein the set of ambient conditions include air temperature, pressure, and humidity.

Embodiment 31

The electrochemical cell of any one of embodiments 22 to 30, wherein the controller is configured to recalibrate the cumulative water imbalance to zero by:
  increasing the flow rate of the oxidant feed gas to the electrochemical cell temporarily in order to dry out the electrochemical cell;
  measuring a resistance of the electrochemical cell;
  stopping flow of the oxidant feed gas once the resistance measured is about equal to a target resistance that corresponds to the cumulative water imbalance being equal to zero; and
  resetting the cumulative water imbalance to zero.

Embodiment 32

The electrochemical cell of embodiment 31, wherein the resistance is measured using a current-interrupt method.

Embodiment 33

The electrochemical cell of embodiment 31 or 32, wherein the target resistance is determined during initial startup testing of the electrochemical cell.

Embodiment 34

The electrochemical cell of any one of embodiments 31 to 33, wherein the target resistance is between about 50 to about 100 mΩ-cm$^2$.

Embodiment 35

The electrochemical cell of any one of embodiments 31 to 34, wherein the controller is configured to recalibrate the cumulative water imbalance at least once per day during a shutdown sequence for the electrochemical cell.

Embodiment 36

The electrochemical cell of any one of embodiments 22 to 35, wherein the controller is configured to recalibrate the cumulative water imbalance to zero by:
  increasing the flow rate of the oxidant feed gas to the electrochemical cell temporarily in order to dry out the electrochemical cell;
  measuring a humidity of the oxidant exhaust gas;
  stopping flow of the oxidant feed gas once the humidity of the oxidant exhaust gas is below a target humidity that corresponds to a cumulative water imbalance of zero; and
  resetting the cumulative water imbalance to zero.

Embodiment 37

The electrochemical cell of embodiment 36, wherein the target humidity is between about 50% and about 99%.

Embodiment 38

The electrochemical cell of any one of embodiments 22 to 37, further comprising a fixed orifice positioned in an oxidant exhaust gas line configured to control a pressure of the oxidant exhaust gas at full power.

Embodiment 39

The electrochemical cell of any one of embodiments 22 to 38, wherein the controller is configured to determine $water_{in}$ based on a humidity of the oxidant feed gas, a pressure of the oxidant feed gas, and the flow rate of the oxidant feed gas.

Embodiment 40

The electrochemical cell of any one of embodiments 22 to 39, wherein the controller is configured to determine $water_{created}$ based a current generated by the electrochemical cell and anode stoichiometric ratio.

Embodiment 41

The electrochemical cell of any one of embodiments 22 to 40, wherein the controller is configured to determine $water_{out}$ based on a humidity of an oxidant exhausted gas and a pressure of the oxidant exhausted gas.

Embodiment 42

The method according to embodiments 9 or 13, wherein the increase in the flow rate is determined based on at least one of the cumulative water imbalance at time of shutdown and a predetermined shutdown time.

Embodiment 43

The method according to embodiments 9 or 13, further comprising a second increase in the flow rate of the oxidant feed gas if the cumulative water imbalance is not reset to zero within a predetermined shutdown time.

Embodiment 44

The electrochemical cell of embodiments 31 or 36, wherein the increase in the flow rate is determined based on at least one of the cumulative water imbalance at time of shutdown and a predetermined shutdown time.

Embodiment 45

The electrochemical cell of embodiments 31 or 36, further comprising a second increase in the flow rate of the oxidant feed gas if the cumulative water imbalance is not reset to zero within a predetermined shutdown time.

The foregoing description has been presented for the purposes of illustration. It is not exhaustive and is not limited to precise forms or embodiments disclosed. Modifications, adaptations, and other applications of the embodiments will be apparent from consideration of the specification and practice of the disclosed embodiments. For example, the described embodiments of fuel cell 10 may be adapted for used with a variety of electrochemical cells. Similarly, the arrangement of cells and the electrochemical stacks described herein are merely exemplary and may be applied to a range of other fuel cells configurations.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all cells and cell stacks falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, the term "about" is used to modify a numerical value above and below the stated value by a variance of 25%, 20%, 15%, 10%, 5% or 1%. In some embodiments, the term "about" is used to modify a numerical value above and below the stated value by a variance of 10%. In some embodiments, the term "about" is used to modify a numerical value above and below the stated value by a variance of 15%. In some embodiments, the term "about" is used to modify a numerical value above and below the stated value by a variance of 10%. In some embodiments, the term "about" is used to modify a numerical value above and below the stated value by a variance of 5%. In some embodiments, the term "about" is used to modify a numerical value above and below the stated value by a variance of 1%.

As used herein, the terms "fuel cell" and "electrochemical fuel cell," and plural variants thereof, may be used interchangeably and are understood to be identical in meaning.

Computer programs, program modules, and code based on the written description of this specification, such as those used by the microcontrollers, are readily within the purview of a software developer. The computer programs, program modules, or code can be created using a variety of programming techniques. For example, they can be designed in or by means of MatLab/Simulink, LabVIEW, Java, C, C++, assembly language, or any such programming languages. One or more of such programs, modules, or code can be integrated into a device system or existing communications software. The programs, modules, or code can also be implemented or replicated as firmware or circuit logic.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A method of controlling water imbalance in an electrochemical cell, comprising:
   determining a present water imbalance in the electrochemical cell by summing a $water_{in}$ and a $water_{created}$ less a $water_{out}$, wherein:

$water_{in}$ is an amount of water introduced into the electrochemical cell by an oxidant feed gas;

$water_{created}$ is an amount of water created by the electrochemical cell from the electrochemical reaction; and $water_{out}$ is an amount of water discharged from the electrochemical cell by an oxidant exhaust gas;

tracking a cumulative water imbalance during operation of the electrochemical cell by repeatedly determining the present water imbalance and summing the present water imbalances;

adjusting a flow rate of the oxidant feed gas entering the electrochemical cell based on the cumulative water imbalance;

wherein a coolant is supplied to the electrochemical cell at a generally fixed inlet coolant temperature, and the inlet coolant temperature is set based on a set of ambient conditions in a way that ensures a potential maximum oxidant gas flow rate needed to bring the cumulative water imbalance to zero is within the operating limits of a compressor supplying the oxidant feed gas flow.

2. The method according to claim 1, wherein adjustment of the flow rate of the oxidant feed gas is controlled using a proportional-integral-derivative (PID) controller; and wherein the flow rate of the oxidant feed gas is adjusted when the cumulative water imbalance deviates from zero in order to bring the cumulative water imbalance to zero.

3. The method according to claim 1, wherein the flow rate of the oxidant gas entering the electrochemical cell is adjusted when the cumulative water balance deviates from zero beyond a set threshold.

4. The method according to claim 1, wherein the coolant is supplied to the electrochemical cell from a coolant pump that is operating at generally fixed speed.

5. The method according to claim 1, further comprising recalibrating the cumulative water imbalance to zero by:

increasing the flow rate of oxidant feed gas to the electrochemical cell temporarily in order to dry out the electrochemical cell;

measuring a resistance of the electrochemical cell;

determining whether the resistance measured is about equal to a target resistance that corresponds to the cumulative water imbalance being equal to zero; and resetting the cumulative water imbalance to zero when the resistance measured is about equal to the target resistance.

6. The method according to claim 5, wherein the resistance is measured using a current-interrupt method;

wherein the target resistance is determined during initial startup testing of the electrochemical cell; and wherein the target resistance is between about 50 and about 100 $m\Omega\text{-}cm^2$.

7. The method according to claim 1, further comprising recalibrating the cumulative water imbalance to zero by:

measuring a baseline resistance of the electrochemical cell;

increasing the flow rate of oxidant feed gas to the electrochemical cell temporarily in order to dry out the electrochemical cell;

measuring a present resistance of the electrochemical cell;

determining whether the present resistance measured has increased relative to the baseline resistance; and resetting the cumulative water imbalance to zero when the present resistance measured has increased by between about 0.5% and about 300% compared to the baseline resistance.

8. The method according to claim 7, wherein recalibrating of the cumulative water imbalance to zero is performed at least once per day during a shutdown sequence for the electrochemical cell.

9. The method according to claim 1, further comprising recalibrating the cumulative water imbalance to zero by:

increasing the flow rate of oxidant feed gas to the electrochemical cell temporarily in order to dry out the electrochemical cell;

measuring a humidity of the oxidant exhaust gas;

determining whether the measured humidity of the oxidant exhaust gas is about equal to a target humidity that corresponds to a cumulative water imbalance of zero; and resetting the cumulative water imbalance to zero when the measured humidity is about equal to the target humidity.

10. The method according to claim 1, wherein the $water_{in}$ is determined based on a humidity of the oxidant feed gas, a pressure of the oxidant feed gas, and the flow rate of the oxidant feed gas;

wherein the $water_{created}$ is determined based on a current generated by the electrochemical cell and an anode stoichiometric ratio; and wherein the $water_{out}$ is determined based on a humidity of an oxidant exhausted gas and a pressure of the oxidant exhausted gas.

11. The method according to claim 5, wherein the increase in the flow rate is determined based on at least one of the cumulative water imbalance at time of shutdown and a predetermined shutdown time.

12. The method according to claim 5, further comprising a second increase in the flow rate of the oxidant feed gas if the cumulative water imbalance is not reset to zero within a predetermined shutdown time.

* * * * *